United States Patent [19]

Kato et al.

[11] 4,138,469

[45] Feb. 6, 1979

[54] PROCESS FOR CATALYTICALLY TREATING EXHAUST GAS CONTAINING $NO_x$ IN THE PRESENCE OF AMMONIA GAS

[75] Inventors: Akira Kato; Shimpei Matsuda; Shigeo Uno; Jinichi Imahashi, all of Hitachi; Yoshihisa Watanabe; Makoto Imanari, both of Inashiki; Fumito Nakajima, Hitachi, all of Japan

[73] Assignees: Mitsubishi Petrochemical Co., Ltd.; Hitachi, Ltd.; Babcock-Hitachi Kabushiki Kaisha, all of Japan

[21] Appl. No.: 781,980

[22] Filed: Mar. 28, 1977

[30] Foreign Application Priority Data

Mar. 26, 1976 [JP] Japan .................................. 51-32590

[51] Int. Cl.$^2$ ............................................. B01D 53/00
[52] U.S. Cl. .................................... 423/239; 423/351
[58] Field of Search ........................ 423/239, 351, 648

[56] References Cited

U.S. PATENT DOCUMENTS 1,123,394  1/1915  Scholl ............................... 423/648 X
3,970,739  7/1976  Shuraishi et al. ................ 423/237 X

FOREIGN PATENT DOCUMENTS 2410715  9/1974  Fed. Rep. of Germany .......... 423/239
1412713  8/1965  France .................................... 423/239

OTHER PUBLICATIONS

Oka et al., "Hydrocarbon Processing"; Oct. 1974, pp. 113-114.

*Primary Examiner*—G. O. Peters
*Attorney, Agent, or Firm*—Craig & Antonelli

[57] ABSTRACT

A process for treating an exhaust gas containing nitrogen oxides, oxygen and ammonia gas with a catalyst consisting essentially of titanium oxide, copper oxide in an amount of 0.02 to 0.3 mole and molybdenum oxide or tungsten oxide in an amount of 0.01 to 0.5 mole per one mole of the titanium oxide. Because the catalyst exhibits good properties for decomposition of ammonia as well as for decomposition of nitrogen oxides it is possible to avoid secondary pollution due to unreacted ammonia.

26 Claims, 1 Drawing Figure

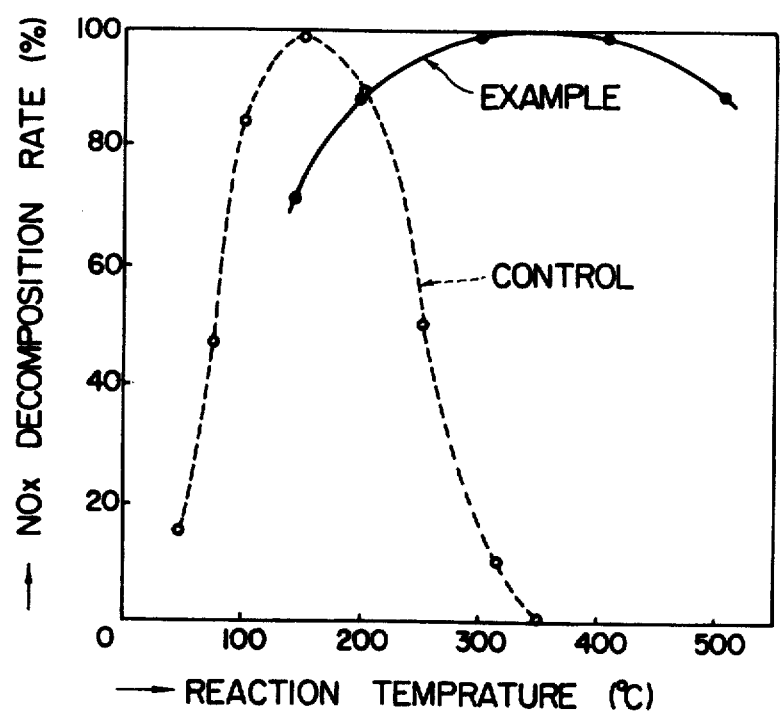

PROCESS FOR CATALYTICALLY TREATING EXHAUST GAS CONTAINING $NO_x$ IN THE PRESENCE OF AMMONIA GAS

BACKGROUND OF THE INVENTION

1. Field of the Invention

This invention is concerned with a process for treating an exhaust gas containing nitrogen oxides, oxygen and ammonia with a catalyst which specifically exhibits an excellent activity to decompose unreacted ammonia in the exhaust gas as well as a high catalytic activity to decompose the nitrogen oxides. Since the catalyst can decompose ammonia in the presence of nitrogen oxides and oxygen in a treatment condition, there is no problem due to unreacted ammonia, which may be contained in the treated exhaust gas in a conventional process which uses ammonia gas as a reducing gas for the nitrogen oxides.

The process according to the present invention is applicable to various treatments of exhaust gases from, such as boilers of power plants, nitric acid production plants, steel making plants, etc.

2. Description of the Prior Art

The co-pending U.S. patent application Ser. No. 531,304, filed Dec. 10, 1974, entitled "Process for Reducing Nitrogen and Novel Catalyst Composition Useful Therefor" discloses that a catalyst consisting of titanium oxide, copper oxide and molybdenum oxide is usable for reducing nitrogen oxides contained in an exhaust gas to nitrogen by catalytically reacting the nitrogen oxides with ammonia gas.

Table 5 of the co-pending application discloses a catalyst consisting of $TiO_2$, CuO and $WO_3$ in an atomic ratio of 8.9:1:0.1 (Molar ratio of the catalyst is 1:0.11:0.011). The $NO_x$ reduction rate in case of this catalyst is 99.7%. Although this catalyst exhibits a good activity on reduction reaction between nitrogen oxides and ammonia, it was found by the present inventors that the catalyst having the above mentioned composition showed an unsatisfactory activity on decomposition of unreacted ammonia. Ammonia gas as a reducing agent is added to an exhaust gas to be treated in excess of a stoichiometric amount with respect to nitrogen oxides, in general, in order to avoid the presence of unreacted nitrogen oxides in a treated exhaust gas. Therefore, an excess amount of ammonia gas tends to be contained in the exhaust gas. If the amount of unreacted ammonia gas is large, a new air pollution will be caused.

There have been known a variety of catalysts for removing nitrogen oxides, which include titanium base catalysts disclosed in the copending application and catalysts of $CuO-Al_2O_3$, $CuO-SiO_2$, $CuO-Cr_2O_3$, $Pt-Al_2O_3$, etc. According to the experiments conducted by the present inventors, the catalysts of $CuO-Al_2O_3$, $CuO-SiO_2$, $CuO-Cr_2O_3$ etc. other than platinum group catalysts showed unsatisfactory activity on decomposition of nitrogen oxides. Further, it was also found that the platinum group catalysts were apt to lose catalytic activities due to poisoning by sulfur oxides in an exhaust gas, and that since the platinum group catalysts exhibited a strong oxidation activity on ammonia, considerable amount of nitrogen oxides is produced during treatment of the gas at elevated temperatures.

SUMMARY OF THE INVENTION

Accordingly, it is an object of the present invention to provide a process for treating an exhaust gas containing nitrogen oxides, oxygen and ammonia gas added to the exhaust gas with a catalyst having a high catalytic activity on decomposition of the ammonia as well as of the nitrogen oxides.

It is another object of the present invention to provide a process for treating an exhaust gas containing nitrogen oxides, oxygen and ammonia added to the exhaust gas with a catalyst, which is not deteriorated by sulfur oxides in the exhaust gas.

The present invention is based upon a discovery that a catalyst having a particular composition consisting of titanium oxide, copper oxide and molybdenum or tungsten oxide exhibits a good activity on decomposition of ammonia without sacrificing a decomposition rate of nitrogen oxides.

According to one aspect of the present invention, there is provided a process for treating an exhaust gas containing nitrogen oxides and oxygen and ammonia gas added to the exhaust gas with a catalyst at an elevated temperature so as to convert the nitrogen oxides and ammonia gas into nitrogen and water, wherein the catalyst consists essentially of oxides of titanium, copper and a member selected from the group consisting of molybdenum, tungsten and combination thereof, an amount of the copper oxide being 0.02 to 0.3 and an amount of the oxide of the member being 0.01 to 0.5 mole per one mole of titanium oxide, respectively.

Other objects and features of the present invention will be apparent from the following detailed description, taken in conjunction with the accompanying drawing.

BRIEF DESCRIPTION OF THE DRAWING

FIGURE is a graph showing relationship between reaction temperatures and $NO_x$ reduction rate (%).

DETAILED DESCRIPTION OF THE INVENTION

After their thorough study of the chemical reaction among nitrogen oxides, oxygen and ammonia, the present inventors found that the chemical reaction may be expressed as follows:

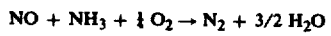

$$NO + NH_3 + \tfrac{1}{4} O_2 \rightarrow N_2 + 3/2 H_2O$$

Although the chemical reaction has been explained by way of NO as a component of nitrogen oxides, this reaction is similarly applicable to such other nitrogen oxides as $N_2O$, $N_2O_3$, $NO_2$, $N_2O_4$, $N_2O_5$. However, since NO is a dominant component of the nitrogen oxides, the following explanation will be made by reference of NO.

As is seen from the above equation, one mole of NO reacts with one mole of ammonia and one fourth mole of oxygen. Since several percents by volume of oxygen is generally contained in exhaust gases from boilers, nitric acid product plants, etc. and since one fourth mole of oxygen is necessary for the reaction, it is not necessary to add oxygen or air to the exhaust gases. Of course, a suitable amount of oxygen or air may be added to an exhaust gas, if oxygen is short for the reaction.

To accomplish the reaction, a stoichiometric amount of ammonia with respect to nitrogen oxides is added to an exhaust gas. This is, however, an ideal case. Because an amount of nitrogen oxides often fluctuates from time to time, shortage of ammonia frequently occurs when an unexpectedly large amount of nitrogen oxides is contained in the exhaust gas.

In order to avoid a leak of unreacted nitrogen oxides from an outlet of a plant for treating an exhaust gas, it is general tht an excess amount of ammonia gas is added to the exhaust gas. As a consequence, unreacted ammonia gas may be contained in the treated exhaust gas, which results in a new air pollution problem. It is, therefore, important to decompose unreacted ammonia during the reaction. According to the present invention, the unreacted ammonia is effectively decomposed or is reacted with nitrogen oxides and oxygen when the gas is contacted with the specific catalyst.

To carry out the chemical reaction, a reaction temperature of an exhaust gas is kept at 190° C. or higher but lower than 500° C. Preferably, the reaction temperature should be maintained within a range of 250 to 450° C. If the reaction temperature is higher than 500° C., ammonia will be oxidized to form nitrogen oxides, and an amount of ammonia consumed for decomposition of nitrogen oxides is increased so that ammonia added will not be effectively used to reduce nitrogen oxides. On the other hand, if the reaction temperature is lower than 190° C., the reaction speed is undedirably slow, and, as a result, it is necessary to lower the space velocity of the exhaust gas in a catalyst bed. As a consequence, a plant for treating the exhaust gas must be increased in volume or capacity. A reaction pressure may widely vary from one atmospheric pressure to about 30 Kg/cm$^2$ preferably from one to 10 Kg/cm$^2$.

The space velocity (an amount of gas flow (h$^{-1}$) per unit volume of a catalyst, measured under an assumption that the gas is kept at 0° C. and one atmosphere, which is hereinafter referred to as SV for simplicity) may vary in accordance with various condition such as the reaction temperature, an amount of ammonia added, etc., but a preferable range of SV is 1,000 to 100,000 h$^{-1}$, and more preferably, SV should be controlled to a range of 2,000 to 30,000 h$^{-1}$.

The catalyst used in the present invention contains as active components titanium, copper and molybdenum or tungsten in the form of oxides. The catalyst is prepared by various methods which have been employed in the art and are disclosed in the co-pending application, for instance.

The catalyst is finally subjected to calcination at a temperature lower than about 700° C., preferably 400° to 650° C. If the calcination is performed at a temperature higher than 700° C., the surface area of titanium oxide becomes small so that catalytic activity of the titanium oxide will be lost. According to investigation of the significance as to the surface area of the titanium oxide, it was found that the titanium oxide should have the surface area of at least 20 m$^2$/g, preferably at least 40 m$^2$/g. The surface area is measured by a BET method, which is well known in the art. The catalyst may be calcined in an oxidative atmosphere or an nonoxidative atmosphere such as an inert gas atmosphere or a reducing atmosphere after catalyst materials are prepared. Other conditions and methods for preparing the catalyst are disclosed in the co-pending application. For example, a co-precipitation or mixing method is employed in the present invention.

As mentioned before, the catalyst used in the present invention consists essentially of titanium oxide, copper oxide in an amount of 0.02 to 0.3 mole and molybdenum oxide and/or tungsten oxide in an amount of 0.01 to 0.5 mole per one mole of titanium oxide. If the amount of copper oxide exceeds 0.3 mole per one mole of titanium oxide, the catalyst may be deteriorated by sulfur oxides in an exhaust gas to lower a catalytic activity. On the other hand, if the amount of copper oxide is smaller than 0.02 mole, an activity on ammonia decomposition is unsatisfactory. Further, if the amount of molybdenum and/or tungsten oxide is less than 0.01 mole per one mole of titanium oxide, the activity of the catalysts is not sufficient; and if the amount is larger than 0.5 mole, the cost of the catalysts will be very high. Preferably, the amount of molybdenum oxide or tungsten oxide is within a range of 0.02 to 0.3 mole per one mole of titanium oxide.

The active components can be supported on a suitable refractory carrier such as alumina, silica, zirconia or the like. In this case, an amount of the active components should be at least 3% by weight of the total weight of the catalyst. Preferably, an amount of the active components should be at least 5% by weight.

Starting materials for titanium can be in various forms, such as titanium oxide, water soluble salts of titanium, rutile structure titanium oxide, anatase structure titanium oxide, etc. When rutile or anatase titanium oxide which is calcined above 700° C. is used, it is preferable to treat it with a hot concentrated sulfuric acid to dissolve at least a part of it. By this treatment, the rutile or anatase titanium oxide may exhibit a good catalytic activity. Of these starting materials preferable are titanium oxide made from the salts and titanium oxide treated with hot concentrated sulfuric acid. The following are examples of preferable starting materials for titanium oxide: titanium oxide, titanic acid (TiO$_2$.nH$_2$O), titanium tetrachloride, titanium sulfate, titanyl sulfate, organic titanium compounds such as titanium isopropoxide. The salts or compounds mentioned above are convertible into titanium oxide when heated in non-reducing atmosphere.

When water soluble titanium compounds are used as a starting material, there is added a precipitating agent such as ammonia solution, caustic soda solution, alkali metal carbonate solution, urea or other alkali solutions to an aqueous solution of the compounds.

Starting materials for copper oxide are cuprous oxide, copper hydroxide, copper sulfate, copper nitrate, copper chloride, and the like. When the copper compounds are dissolved in water, such precipitating agents as alkali solutions mentioned above are added to the solution.

Examples of starting materials for molybdenum and tungsten oxides are molybdenum oxide, ammonium molybdate, tungsten oxides, tungsten acids, ammonium paratungstate, and tungsten silicate. Methods of preparing precipitates of molybdenum and tungsten compounds are disclosed in the co-pending application. Such compounds as copper molybdate (Cu$_2$MoO$_5$) or copper tungstate (Cu$_2$WO$_5$) may also be used as a starting material.

The present invention will be described in detail by reference to illustrative examples.

EXAMPLE 1

(1) Preparation of a catalyst (TiO$_2$—CuO—MoO$_3$)

53.4 of copper nitrate (Cu(NO$_3$)$_2$.3H$_2$O) and 19.5 of ammonium molybdate ((NH$_4$)$_6$Mo$_7$O$_{24}$.4H$_2$O) were mixed with 500 g of a slurry of metatitanic acid (150 g as TiO$_2$). 500 g of distilled water was added to the mixture, and the resulting mixture was thoroughly kneaded by means of a kneader. The kneaded mixture was pre-calcined at 300° C. for 5 hours, and the resulting pre-calcined mixture was admixed with 3% by weight of graphite powder. The mixture was then molded under about 500 kg/cm² to obtain pellets of 6 mm diameter and 6 mm thickness. The pellets were then calcined at 500° C. for 4 hours. The thus prepared catalyst had a composition of $TiO_2$, CuO and $MoO_3$ in a molar ratio of 1:0.13:0.06.

(2) Preparation of a catalyst (Pt—Al₂O₃)

5 m liters of an aqueous solution of hexachloro platinate ($H_2PtCl_6$) (the concentration of the solution being 10 g Pt/100 g solution) was diluted with distilled water to make a 70 m liters solution.

100 g of a powdery alumina carrier of 10-20 mesh was impregnated with the solution. The impregnated carrier was then dried at 120° C. for 5 hours, and thereafter reduced at 450° C. for 3 hours in a hydrogen gas stream. The catalyst obtained contained 5% by weight of platinum.

(3) Treatment of a gas with the catalysts

A testing apparatus used was the type of a known normal-pressure static bed.

Each of the catalysts mentioned above was charged in a reactor tube made of quartz glass having an inner diameter of 16 mm of the apparatus. A thermo-couple which was placed in a protecting quartz glass tube was provided for measuring reaction temperatures within the catalyst bed.

The reaction tube having the catalyst bed was heated by an electric furnace to elevate a temperature of the bed. The volume of each of the catalyst beds was 4 ml.

The gas having the following composition was passed through the reactor tube at SV of 10,000 h⁻¹:

NO: 280-320 ppm
$NH_3$: 280-320 ppm
$SO_2$: 450-550 ppm
$O_2$: 2-4 vol.%
$CO_2$: 10-13 vol. %
$H_2O$: 12-16 vol. %
$N_2$: bal.

Relationships of reaction temperatures and $NO_x$ decomposition rates were measured. $NO_x$ was measured by an $NO_x$ analyzer of chemiluminescence type. The results are shown in FIGURE. In FIGURE, $NO_x$ decomposition rate (%) is represented as follows:

$NO_x$ decomposition rate (%) =

$$\frac{NO_x \text{ amount at an inlet} - NO_x \text{ amount at an outlet}}{NO_x \text{ amount at an inlet}} \times 100$$

Pt—Al₂O₃ catalyst shown as a control exhibited a high activity at low temperatures, its activity decreased rapidly as a reaction temperature was increased. The activity of Pt—Al₂O₃ catalyst over 200° C. was very low because ammonia was oxidized to form $NO_x$. Over 350° C. there was found that an amount of $NO_x$ at the outlet of the apparatus was larger than that of the inlet.

On the other hand, the catalyst of $TiO_2$—CuO—$MoO_3$ exhibited high decomposition rates over a wide range of reaction temperatures of 210 to 500° C.

EXAMPLE 2

(1) 500 g of an aqueous solution of titanium tetrachloride ($TiCl_4$) was diluted with one liter of distilled water. The resulting solution was titrated slowly into a 1N NaOH solution to precipitate titanium hydroxide. The final pH of the solution containing the precipitate was adjusted to 7. The precipitate was rinsed by decantation with distilled water, and filtered.

The rinsed precipitate was mixed with 47 g of copper molybdate ($Cu_2MoO_5$), and the mixture was thoroughly kneaded to obtain a paste like mixture. The paste was then pre-calcined at 300° C. for 5 hours, and the pre-calcined was admixed with 3% by weight of graphite powder to mold it under a molding pressure of about 500 kg/cm². Pellets of the catalyst having 6 mm diameter and 6 mm thickness were obtained. The composition of the catalyst was $TiO_2$:CuO:$MoO_3$ = 1:0.13:0.06 in molar ratio. The pellets were ground to 10 to 20 mesh powder.

(2) 500 g of aluminum nitrate ($Al(NO_3)_3 \cdot 9H_2O$) was dissolved in one liter of distilled water. The resulting solution wa titrated slowly into a 1N NaOH solution to pecipitate alumina sol. The final pH of the solution of the sol was adjusted to 7. The sol was well rinsed by decantation with distilled water, and then filtered.

24 g of copper molybdate was admixed with the rinsed sol and, thereafter, the mixture was thoroughly kneaded to obtain a paste. The paste was mixed with 3% by weight of graphite powder. The mixture was molded under a molding pressure of about 500 kg/cm² to obtain pellets each having 6 mm diameter and 6 mm thickness. The pellets were calcined at 500° C. for 4 hours. The catalyst composition in molar ratio was $Al_2O_3$:CuO:$MoO_3$ = 1:0.13:0.06. The catalyst pellets were crushed to 10 to 20 mesh particles.

(3) Each of the catalysts mentioned above was used in treatment of the exhaust gas in the same manner as in Example 1 except for SV = 50,000 h⁻¹. The results are shown in Table 1. As is seen from Table 1, the catalyst of $TiO_2$—CuO—$MoO_3$ has a far better catalytic activity than the $Al_2O_3$—CuO—$MoO_3$ catalyst, Table 1

| Reaction Temp. (° C.) | $TiO_2$—CuO—$MoO_3$ | $Al_2O_3$—CuO—$MoO_3$ |
|---|---|---|
| | $NO_x$ Decomposition Rate (%) | |
| 250 | 92 | 28 |
| 300 | >99 | 51 |
| 350 | >99 | 68 |
| 400 | 96 | 60 |
| 450 | 92 | 51 |
| 500 | 86 | 40 |

EXAMPLE 3

Except for changing the ratios of $TiO_2$ and $MoO_3$, the same gas treatment as in Example 1 was carried out at SV = 50,000 h⁻¹. The results are shown in Table 2.

Table 2

| Reaction Temp. (C.) | $NO_x$ Decomposition Rate (%) $TiO_2/CuO/MoO_3$ Molar Ratio | | | | | | | | |
|---|---|---|---|---|---|---|---|---|---|
| | 1/0.11/0 | 1/0.01/0.01 | 1/0.02/0.02 | 1/0.06/0.06 | 1/0.13/0.06 | 1/0.14/0.28 | 1/0.33/0.33 | 1/0.5/0.5 | 1/0/0.11 |
| 200 | 74 | 71 | 77 | 81 | 82 | 81 | 78 | 76 | 80 |
| 250 | 83 | 82 | 87 | 92 | 93 | 91 | 88 | 85 | 89 |
| 300 | 91 | 91 | 95 | 99 | 99 | 99 | 96 | 93 | 96 |
| 350 | 95 | 96 | 99 | 99 | 99 | 99 | 99 | 99 | 99 |

Table 2-continued

| Reaction Temp. (C.) | NO$_x$ Decomposition Rate (%) TiO$_2$/CuO/MoO$_3$ Molar Ratio | | | | | | | | |
|---|---|---|---|---|---|---|---|---|---|
| | 1/0.11/0 | 1/0.01/0.01 | 1/0.02/0.02 | 1/0.06/0.06 | 1/0.13/0.06 | 1/0.14/0.28 | 1/0.33/0.33 | 1/0.5/0.5 | 1/0/0.11 |
| 400 | 99 | 99 | 99 | 97 | 98 | 96 | 95 | 94 | 99 |
| 450 | 94 | 99 | 97 | 93 | 94 | 92 | 90 | 88 | 99 |
| 500 | 79 | 88 | 88 | 87 | 88 | 86 | 83 | 79 | 90 |

EXAMPLE 4

Instead of ammonium molybdate in Example 1, ammonium tungstate was used as a starting material. Gas treatment using catalysts prepared in the same manner as in Example 1 under the same conditions as in Example 3 was conducted to obtain results shown in Table 3.

Table 3

| Reaction Temp. (°C.) | TiO$_2$/CuO/WO$_3$ Molar Ratio NO$_x$ Decomposition Rate (%) | | | | | | | |
|---|---|---|---|---|---|---|---|---|
| | 1/0.01/0.01 | 1/0.02/0.02 | 1/0.06/0.06 | 1/0.13/0.06 | 1/0.14/0.28 | 1/0.33/0.33 | 1/0.5/0.5 | 1/0/0.11 |
| 200 | 70 | 76 | 80 | 81 | 80 | 77 | 75 | 76 |
| 250 | 81 | 87 | 91 | 92 | 91 | 88 | 84 | 85 |
| 300 | 90 | 95 | >99 | >99 | >99 | 96 | 92 | 92 |
| 350 | 95 | 99 | >99 | >99 | >99 | 99 | 98 | 98 |
| 400 | >99 | 98 | 96 | 97 | 95 | 94 | 93 | >99 |
| 450 | 98 | 95 | 92 | 93 | 90 | 89 | 88 | >99 |
| 500 | 87 | 86 | 86 | 87 | 84 | 82 | 81 | 93 |

EXAMPLE 5

In this example a life test of catalysts, compositions of which are shown in Table 4, was conducted by contacting an exhaust gas of a heavy oil burning boiler with the catalysts. 5 liters of the catalysts having 6 mm diameter and 6 mm thickness were respectively charged in reactors each having an inner diameter of 150 mm. The exhaust gas composition was as follows:

NO$_x$: 150–210 ppm
NH$_3$: 150–210 ppm
SO$_2$: 1,000–1,300 ppm
SO$_3$: 30–70 ppm
H$_2$O: 8–11 vol. %
O$_2$: 3–6 vol. %
CO$_2$: 11–14 vol. %
N$_2$: bal.
dust: 60–90 mg/Nm$^3$ The reaction temperature was 350° ± 10° C., and SV was 10,000 h$^{-1}$. The results shown in Table 4 were obtained by 2,000 hours continuous tests.

Table 4

| | TiO$_2$/CuO/MoO$_3$ = 1/0.13/0.06 | TiO$_2$/CuO/WO$_3$ = 1/0.13/0.06 |
|---|---|---|
| Reaction Time (h) | Decomposition Rate (%) | |
| Initial | >99 | >99 |
| 250 | >99 | >99 |
| 500 | 99 | 98 |
| 750 | 98 | 97 |
| 1,000 | 97 | 96 |
| 1,250 | 96 | 96 |
| 1,500 | 97 | 95 |
| 2,000 | 97 | 96 |

As is seen from Table 4, the catalysts were not deteriorated in their catalytic activity in the presence of sulfur oxides for a very long period of time.

EXAMPLE 6

Catalysts prepared in the same manner as in Example 3 and 4 were charged in the reactor set forth in Example 5. Gas treatment at 350° C. was conducted at a space velocity of 10,000 h$^{-1}$. The results are shown in Table 5.

Table 5

| | Left column: NO$_x$ decomposition Rate (%); Right column: NH$_3$ amount at outlet (ppm) | | | |
|---|---|---|---|---|
| Molar ratio | TiO$_2$/CuO/MoO$_3$ | | TiO$_2$/CuO/WO$_3$ | |
| 1/0/0.11 | >99 | 38 | >99 | 40 |
| 1/0.11/0 | >99 | 11 | — | — |
| 1/0.01/0.01 | >99 | 17 | >99 | 19 |
| 1/0.02/0.1 | >99 | 12 | >99 | 13 |
| 1/0.01/0.3 | >99 | 3 | >99 | 5 |
| 1/0.1/0.02 | >99 | 4 | >99 | 6 |
| 1/0.1/0.3 | >99 | 3 | >99 | 5 |
| 1/0.13/0.06 | >99 | 2 | >99 | 4 |
| 1/0.3/0.1 | >99 | 4 | >99 | 6 |
| 1/0.04/0.1 | >99 | 6 | >99 | 9 |
| 1/0.5/0.5 | >99 | 6 | >99 | 8 |

As is seen in Table 5, an amount of NH$_3$ detected at an outlet of a reactor tube was not larger than 13 ppm when the molar ratio of copper oxide to titanium oxide was not smaller than 0.02. When the ratio is larger than 0.3, the amount of NH$_3$ detected at an outlet was considerably small. However, it was found by a life test that the catalyst containing copper oxide in the molar ratio larger than 0.3 was deteriorated by sulfur oxides. The results of the life test are shown in Table 6.

Table 6

| Catalyst Molar ratio | TiO$_2$/CuO/MoO$_3$ | | TiO$_2$/CuO/WO$_3$ | |
|---|---|---|---|---|
| | Initial decomposition rate (%) of NO$_x$ | Decomposition rate (%) of NO$_x$ after 1,000 hours | Initial decomposition rate (%) of NO$_x$ | Decomposition rate (%) of NO$_x$ after 1,000 hours |
| 1/0.3/0.1 | >99 | 91 | >99 | 90 |
| 1/0.4/0.1 | >99 | 82 | >99 | 81 |

Only a small decrease in the NO$_x$ decomposition rate (%) in case of the catalysts containing copper oxide in an amount of 0.3 was observed, while there was a considerable decrease in the NO$_x$ decomposition rate in case of the catalysts containing copper oxide in an amount of 0.4.

Therefore, the molar ratio of the copper oxide to titanium oxide should be not larger than 0.3.

The gas composition used in this Example was as ollows:

NO$_x$: 200 ppm

NH$_3$: 240 ppm
SO$_2$: 1,000–1,300 ppm
SO$_3$: 30–70 ppm
H$_2$O: 8–10 vol. %
O$_2$: 3–6 vol. %
CO$_2$: 11–14 vol. %
N$_2$: bal.

While the detailed description has been made by reference to a specific number of examples, it should be noted that the above description was made to illustrate the present invention, not to limit the scope of the present invention. Further, it will be apparent to one having ordinarily skill in the art that molybdenum oxide and tungsten oxide may be contained in the catalyst while the catalysts used in the above described examples contained only one of them.

What we claim is:

1. A process for treating an exhaust gas containing nitrogen oxides, oxygen and ammonia added as a sole reducing agent with a catalyst at an elevated temperature so as to convert the nitrogen oxides and ammonia into nitrogen and water, wherein the catalyst consists essentially of active oxides of titanium, copper and a member selected from the group consisting of molybdenum, tungsten and a combination thereof, an amount of copper oxide being 0.02 to 0.3 mole and an amount of the oxide of the member being 0.01 to 0.5 mole per one mole of titanium oxide, respectively.

2. A process for treating an exhaust gas containing nitrogen oxides, oxygen and ammonia according to claim 1, wherein said member is molybdenum.

3. A process for treating an exhaust gas containing nitrogen oxides, oxygen and ammonia according to claim 1, wherein said member is tungsten.

4. A process for treating an exhaust gas containing nitrogen oxides, oxygen and ammonia added as a sole reducing agent with a catalyst at an elevated temperature of 250° to 450° C. so as to convert the nitrogen oxides and ammonia into nitrogen and water, wherein the catalyst consists essentially of active oxides of titanium, copper and a member selected from the group consisting of molybdenum, tungsten and a combination thereof, an amount of copper oxide being 0.02 to 0.3 mole and an amount of the oxide of the member being 0.01 to 0.5 mole per one mole of titanium oxide, respectively, and wherein an amount of the ammonia is stoichiometric with respect to the nitrogen oxides.

5. A process for treating an exhaust gas containing nitrogen oxides, ammonia and oxygen according to claim 4, wherein the member is molybdenum.

6. A process for treating an exhaust gas containing nitrogen oxides, ammonia and oxygen according to claim 4, wherein the member is tungsten.

7. A process for treating an exhaust gas containing nitrogen oxides, ammonia and oxygen according to claim 1, wherein the amount of the oxide of the member is 0.02 to 0.3 mole per one mole of titanium oxide.

8. A process for treating an exhaust gas containing nitrogen oxides, oxygen and ammonia added as a sole reducing agent with a catalyst at an elevated temperature of 250° to 450° C. so as to convert the nitrogen oxides and ammonia into nitrogen and water wherein the exhaust gas to be treated has the following composition:

nitrogen oxides: 150–210 ppm
ammonia: 150–210 ppm
sulfur oxides: 1030–1370 ppm
oxygen: 8–11% by volume
nitrogen and others: balance said catalyst consisting essentially of active oxides of titanium, copper and a member selected from the group consisting of molybdenum, tungsten and a combination thereof, wherein an amount of copper oxide is 0.02 to 0.3 mole and an amount of the oxide of member is 0.01 to 0.5 mole per one mole of titanium oxide, respectively.

9. A process for treating an exhaust gas containing nitrogen oxides, ammonia and oxygen according to claim 8, wherein the space velocity of the exhaust gas per unit volume of the catalyst is 1,000 to 100,000 h$^{-1}$.

10. A process for treating an exhaust gas containing nitrogen oxides, ammonia and oxygen according to claim 8, wherein the member is molybdenum.

11. A process for treating an exhaust gas containing nitrogen oxides, ammonia and oxygen according to claim 8, wherein the member is tungsten.

12. A process for treating an exhaust gas containing nitrogen oxides, oxygen and ammonia according to claim 1, wherein the active titanium oxide has a surface area of at least 20 m$^2$/g.

13. A process according to claim 12, wherein the active titanium oxide has a surface area of at least 40 m$^2$/g.

14. A process for treating an exhaust gas containing nitrogen oxides, oxygen and ammonia according to claim 4, wherein the amount of the oxide of the member is 0.02 to 0.3 mole per one mole of titanium oxide.

15. A process for treating an exhaust gas containing nitrogen oxides, oxygen and ammonia according to claim 4, wherein the active titanium oxide has a surface area of at least 20 m$^2$/g.

16. A process according to claim 15, wherein the active titanium oxide has a surface area of at least 40 m$^2$/g.

17. A process for treating an exhaust gas containing nitrogen oxides, ammonia and oxygen according to claim 9, wherein the amount of the oxide of the member is 0.02 to 0.3 mole per one mole of titanium oxide.

18. A process for treating an exhaust gas containing nitrogen oxides, ammonia and oxygen according to claim 9, wherein the active titanium oxide has a surface area of at least 20 m$^2$/g.

19. A process according to claim 18, wherein the active titanium oxide has a surface area of at least 40 m$^2$/g.

20. A process according to claim 9, wherein the space velocity of the exhaust gas per unit volume of the catalyst is 2,000 h$^{-1}$ to 30,000 h$^{-1}$.

21. A process for reducing nitrogen oxides contained in an exhaust gas in the presence of oxygen which comprises:

adding ammonia gas as a sole reducing agent to the exhaust gas in a stoichiometric excess amount to the nitrogen oxides, and contacting the mixed exhaust gas with a catalyst consisting essentially of active titanium oxide, copper oxide and tungsten oxide or molybdenum oxide in a molar ratio of 1:0.02 to 0.3:0.01 to 0.5, at a temperature of 250° to 450° C. and at a space velocity of 1,000 h$^{-1}$ to 100,000 h$^{-1}$, whereby the reducing reaction of nitrogen oxides and the decomposing reaction of unreacted ammonia take place in one step.

22. A process according to claim 21, wherein the active titanium oxide has a surface area of at least 20 m$^2$/g.

23. A process according to claim 22, wherein the active titanium oxide has a surface area of at least 40 m²/g.

24. A process according to claim 22, wherein the molar ratio is 1:0.02 to 0.3:0.02 to 0.3.

25. A process according to claim 22, wherein the space velocity is 2,000 h$^{-1}$ to 30,000 h$^{-1}$.

26. A process for removing nitrogen oxides from an exhaust gas by reduction with ammonia in the presence of oxygen and a catalyst with the attendant decomposition of unreacted ammonia wherein the nitrogen oxides and ammonia are converted to nitrogen and water comprising the step of contacting an exhaust gas containing nitrogen oxides in the presence of oxygen and ammonia, in an amount stoichiometrically excessive to the nitrogen oxides, with a catalyst consisting essentially of active titanium oxide, copper oxide, and at least one member of tungsten oxide or molybdenum oxide, the active oxides of titanium, copper and the member being in a molar ratio of 1:0.02 to 0.3:0.02 to 0.3, respectively, at a temperature of 250° C. to 450° C. and at a space velocity of 2,000 h$^{-1}$ to 30,000 h$^{-1}$, the active titanium oxide having a surface area of at least 20 m²/g, whereby the nitrogen oxides and ammonia are converted to nitrogen and water with the attendant decomposition of unreacted ammonia.

* * * * *